C. T. FAIRBANKS.
TIRE STAND.
APPLICATION FILED AUG. 22, 1919.
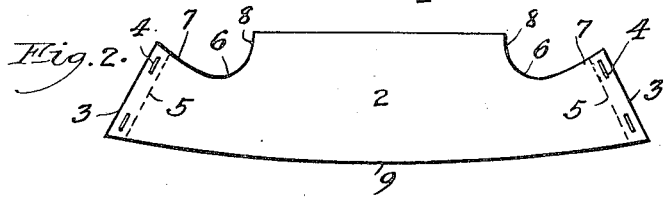
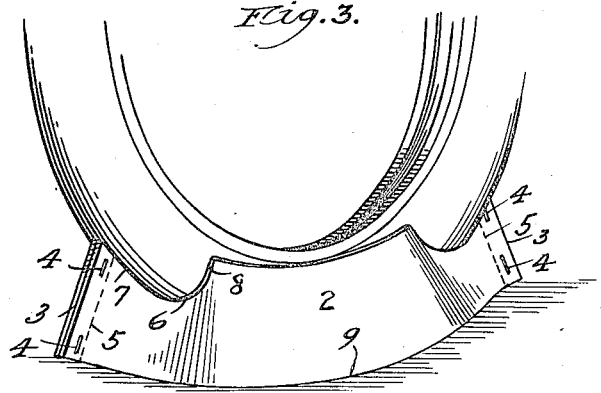
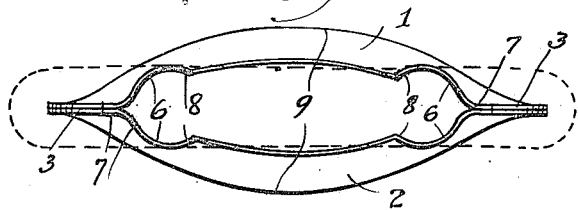
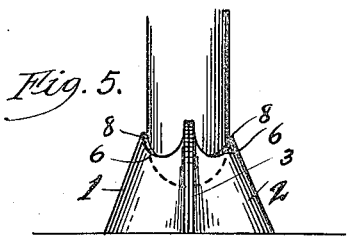
Inventor,
Clarence T. Fairbanks.

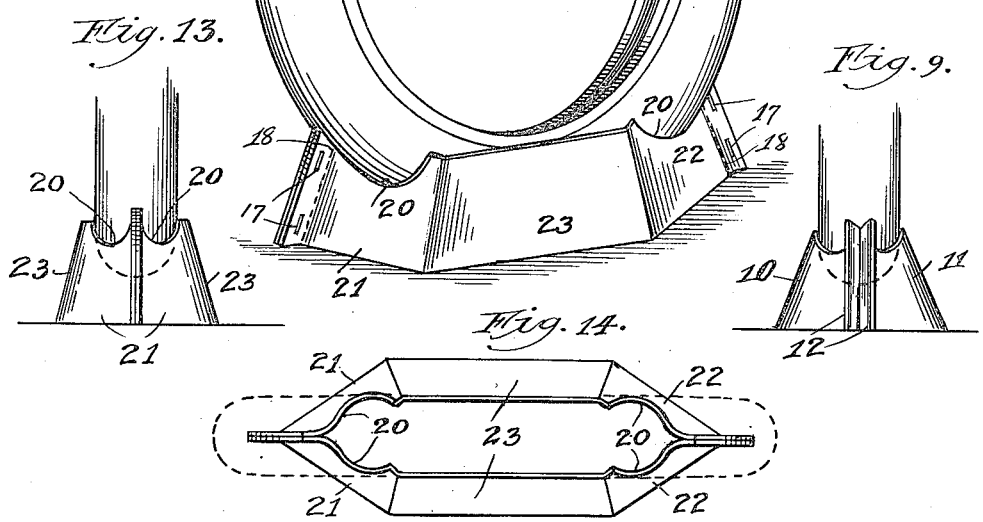

Patented Sept. 5, 1922.

1,428,223

UNITED STATES PATENT OFFICE.

CLARENCE T. FAIRBANKS, OF CHICAGO, ILLINOIS.

TIRE STAND.

Application filed August 22, 1919. Serial No. 319,080.

*To all whom it may concern:*

Be it known that I, CLARENCE T. FAIRBANKS, a citizen of the United States, residing at Chicago, in the county of Cook and State of Illinois, have invented certain new and useful Improvements in Tire Stands, of which the following is a specification.

My invention has reference more particularly to a support which is preferably constructed in a collapsible form and adapted to hold a tire or other similar article in upright position for the purpose of display.

The principal objects of my invention are, to afford a convenient and inexpensive display stand for tires or other circular articles; to provide a stand of this character which may be readily collapsed into a compact form for shipping and packing; to provide a stand of this character affording a firm base for the article to be supported, and suitably engaging the article to hold the latter in an upright position; to provide a tire stand which fits any size tires; to provide a support wherein the ends are spread apart by the weight of the supported tire and the sides thereby engaged firmly against the side of the tire to hold it rigidly in upright position; and in general, to provide an improved device, for displaying tires or other circular articles, which is easy to manufacture, neat in appearance, affords a full view of almost the entire tire or article supported thereby, and provides maximum space for advertising matter thereon.

On the drawings, Fig. 1 is a top or upper edge view of the holder when collapsed; Fig. 2, a side view thereof; Fig. 3, a perspective view of the holder, with a tire mounted thereon; Fig. 4, a top view of the holder expanded and with the tire shown in dotted lines; Fig. 5, an end view of the holder with a tire thereon; Figs. 6 and 7, side views of the two side members of a modified form of tire holder; Fig. 8, a top view of said side members assembled and expanded so as to support a tire; Fig. 9, an end view of the holder shown in Fig. 8 with a tire mounted thereon; Figs. 10 and 11, top and side views respectively of another modified form of the tire support or holder, collapsed; Fig. 12, a perspective view of the modified form of holder expanded and supporting a tire; Fig. 13, an end view of the modified form of holder with the tire thereon; and Fig. 14, a top view of said holder in the expanded condition, showing, in dotted lines, the tire supported thereon.

This tire holder consists of a pair of side members which may be connected at their ends in any suitable manner to permit separation of said members intermediate of the ends, the upper edges of said members being shaped so that when the side members are separated from one another intermediate of their ends, they will fit and support a tire in an upright position, and the lower edges being shaped so that when the side members are separated to support a tire, said edges are positioned in a horizontal plane to afford a firm support for the holder and tire.

In the structure shown in Figs. 1 to 5 inclusive, I provide a pair of elongated side members or plates 1 and 2 having the end edges converging upwardly, as indicated at 3, and secured together at the ends by means of staples 4, adhesive, or in any other suitable manner. Spaced inwardly from the end edges 3 and parallel therewith the side members 1 and 2 are preferably scored at 5 or otherwise adapted to permit the intermediate portions of the side members 1 and 2 to be spread apart from one another without undue strain on the staples 4, or other end fastening, so as to permit a portion of a tire to be inserted downwardly between the members 1 and 2 intermediate of their ends, as shown in Fig. 3. Each side member 1 and 2 at each end is correspondingly cut away or notched at 6, so that when the side members 1 and 2 are separated, the portions 7 of the notches afford gradually diverging edges engaging under the tire, and the upwardly extending portions 8 reach up and fit against the side walls of the tire and cooperate with the supporting edges 7 to maintain the tire in an upright position. The engagement of the curved periphery of the tire against the end portions of the holder tends to stretch the holder lengthwise and flatten the side walls together, this being prevented by an interposed portion of the tire, and the side walls, as a consequence, hug the interposed portion of the tire and hold same rigidly in upright position.

The lower edges 9 of the side members 1 and 2 are constructed on the proper curvature, as clearly indicated in Fig. 2, so that when said side members are expanded sufficiently to support the tire, the lower edges of the members 1 and 2 lie in a horizontal plane, as shown in Fig. 5, and provide a firm engagement with a supporting surface.

It will be observed that with this construction the bottom portions of the members 1 and 2 are expanded to a greater extent than the upper portions, or flare outwardly at the bottom so that while the holder fits neatly against the tire, a wide base is provided to insure a substantial support.

In Figs. 6 to 9 inclusive, I have shown a modified form differing from the structure just described in the manner of making the end connection of the side-plates. In these views, the side-plates 10 and 11 are reversely slotted on lines substantially parallel with the end edges 12, so as to provide a detachable instead of a permanent connection at the ends. The side-plate 10 has a slot 13 at each end extending upwardly substantially one-half the vertical width of the end portion of the plate, and the plate 11 has a slot 14 at each end extending downwardly a like distance so that the ends may be interlocked, as shown in Figs. 8 and 9, with the marginal edges of the plates coinciding.

With this construction it is unnecessary to score the ends of the plates to provide a break as in the structure shown in Fig. 1 to 5 inclusive, as the slot connection permits the necessary relative movement of the ends of the side members, as will be readily understood.

In Figs. 10 to 14 inclusive, I have shown another modified form similar to that shown in Figs. 1 to 5 inclusive except that the side members 15 and 16 are arranged to expand or separate in an angular form instead of bowing outwardly as in the structure first described.

The ends of these side members are connected together by means of staples 17, adhesive, or other suitable fastening, and scored at 18, and are also scored at 19 on downwardly diverging lines at the inner end of each notch 20. Each side member when separated breaks into angularly related sections 21, 22 and 23, as clearly shown in the drawings.

In this construction, the lower edge 24 of each side member 15 and 16 instead of being arranged on a curved line as in the structures previously described, is in an angular form, as shown in Fig. 11, so that when the side members are separated the lower edges of the angularly related parts are positioned in a horizontal plane, as shown in Fig. 13.

In this structure just described, I have shown the ends as connected by means of the rivets 17, but it is to be understood that in any form of the invention, an end connection similar to that shown in Figs. 6 to 9 inclusive may be employed, or the ends may be connected or united in any manner which will permit the desired separation of the side members.

I contemplate making this holder of cardboard or any other material which is capable of serving the purpose, and I also purpose to use the outside surfaces to display advertising matter thereon, as these surfaces are adapted to be readily observed by one looking at the tire. In all the forms of construction, the longitudinal stretching of the holder by the interposed portion of the tire clamps the side walls of the holder securely against the interposed portion of the tire and thereby holds the tire rigidly in upright position.

While I have shown and described my invention in certain convenient and preferred form, I am aware that various changes and modifications may be made without departing from the principle of my invention, and I therefore do not propose limiting the patent granted hereon otherwise than necessitated by the prior art.

I claim as my invention:

1. In a support for a circular article the combination of an elongated shell having opposite tapered ends formed by convergently arranging and connecting together the corresponding ends of the side walls of the shell, said convergent portions of the side walls at each end of the shell being correspondingly notched at their upper edges to afford seats adapted to engage a circular article at circumferentially spaced points and to extend circumferentially under the periphery of such article.

2. In a supporting base for a ring-shaped article, the combination of a pair of elongated side members arranged side by side and joined together at their ends on upwardly converging lines, and adapted to be intermediately separated to afford a downwardly flared base, the lower edges of said members being extended downwardly intermediate of their ends so as to lie in a common plane when the side members are expanded to support an article thereon.

3. In a support for a ring-shaped article, the combination of a pair of elongated side members arranged side by side and having the corresponding ends connected together so that the intermediate portions may be bowed outwardly from one another, said members having their lower edges extended downwardly, intermediate of the ends, so as to lie in the same plane with the end portions thereof when the members are bowed apart, and having the upper edges notched at each end to fit the surface of and thereby support a ring-shaped article when the members are spread apart.

4. In a support for a circular article the combination of a shell comprising a pair of elongated side walls having the corresponding ends thereof hinged together on an upwardly extending axis so that the intermediate portions of the side members may be separated to receive a circular article edgewise therebetween and convergently position the corresponding end portions of the side walls so that the upper edges thereof afford seats adapted to extend obliquely under the periphery of a circular article on the support.

5. In a support for ring-shaped articles, the combination of a pair of side members having the ends connected together so that the side members may be outwardly bowed to receive the lower portion of a ring-shaped article therebetween, said side members being provided with raised intermediate portions and inwardly sloping upper edges at each end, said edges being adapted to be engaged by the periphery of the supported article, so that the latter exerts a longitudinal elongating strain on the support and thereby causes the intermediate raised portions of the side members to hug the portion of the article interposed therebetween for holding the article rigidly in upright position.

6. In a support for ring-shaped articles, the combination of a pair of elongated side members arranged side by side and having corresponding ends thereof connected together, means permitting intermediate portions of said members to be bent laterally from the connected ends on upwardly converging lines, said side members having the lower edges extended downwardly intermediate of the ends; to provide a flat bottom when the members are separated, and said members being correspondingly notched at each end to afford divergent seats for supporting an article between the members when the latter are separated.

7. In a support for a circular article, the combination of a pair of elongated members each having slots at the ends adapted to interlock with slots at the ends of the other side members for hinging the side members together at the ends on an upwardly extending axis, said side members being correspondingly notched at each end to provide seats adapted to engage under and up against the sides of a circular article inserted between the members for supporting said article in an upright position.

CLARENCE T. FAIRBANKS.